US010668959B2

(12) United States Patent
Hall et al.

(10) Patent No.: US 10,668,959 B2
(45) Date of Patent: Jun. 2, 2020

(54) BIG AIR CONTROL APPARATUS

(71) Applicants: David R. Hall, Provo, UT (US);
Stephen R. Hall, Draper, UT (US);
Jason Simpson, Provo, UT (US); Joe Fox, Spanish Fork, UT (US); Jedediah Knight, Provo, UT (US)

(72) Inventors: David R. Hall, Provo, UT (US);
Stephen R. Hall, Draper, UT (US);
Jason Simpson, Provo, UT (US); Joe Fox, Spanish Fork, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 184 days.

(21) Appl. No.: 15/642,778

(22) Filed: Jul. 6, 2017

(65) Prior Publication Data
US 2019/0009843 A1    Jan. 10, 2019

(51) Int. Cl.
*B62D 37/06* (2006.01)
*B62D 1/04* (2006.01)
*B62D 1/187* (2006.01)
*B62D 6/04* (2006.01)
*B62D 15/02* (2006.01)
*B62D 37/00* (2006.01)
*B62D 23/00* (2006.01)

(52) U.S. Cl.
CPC ............... *B62D 37/06* (2013.01); *B62D 1/04* (2013.01); *B62D 1/187* (2013.01); *B62D 6/04* (2013.01); *B62D 15/029* (2013.01); *B62D 37/00* (2013.01); *B62D 23/005* (2013.01)

(58) Field of Classification Search
CPC ...... B62D 37/00; B62D 37/06; B62D 15/029; B62D 6/04; B62D 1/04; B62D 1/187; B62D 23/005
See application file for complete search history.

(56) References Cited

U.S. PATENT DOCUMENTS

| | | | | |
|---|---|---|---|---|
| 6,129,306 A | * | 10/2000 | Pham | B60F 5/02 244/2 |
| 9,440,507 B2 | * | 9/2016 | Giovanardi | F15B 13/0444 |
| 2011/0297462 A1 | * | 12/2011 | Grajkowski | B60K 26/04 180/54.1 |
| 2013/0031997 A1 | * | 2/2013 | Caravella | B64C 13/0423 74/471 R |
| 2016/0121905 A1 | * | 5/2016 | Gillingham | B62D 5/0406 701/37 |
| 2018/0009279 A1 | * | 1/2018 | Hamel | B60F 5/02 |
| 2018/0304893 A1 | * | 10/2018 | Hall | B60W 30/18009 |

* cited by examiner

Primary Examiner — James A English

(57) ABSTRACT

Various embodiments of an apparatus for changing the in-air pitch and/or roll of a land craft are described herein. The apparatus may include a steering input mechanism, a support structure, and an articulator. The apparatus may include one or more of a pitch-forward input mechanism, a pitch-back input mechanism, a roll-right input mechanism, and a roll-left input mechanism. The vehicle may include a set of wheels on which the vehicle travels over ground. The steering input mechanism may receive steering inputs from a driver of the vehicle. The steering input mechanism may receive pitch and roll control inputs from the driver. The support structure may connect the steering input mechanism to the vehicle, at least one of the wheels, or the vehicle and the at least one of the wheels. The articulator may rotatably connect the steering input mechanism to the support structure.

20 Claims, 14 Drawing Sheets

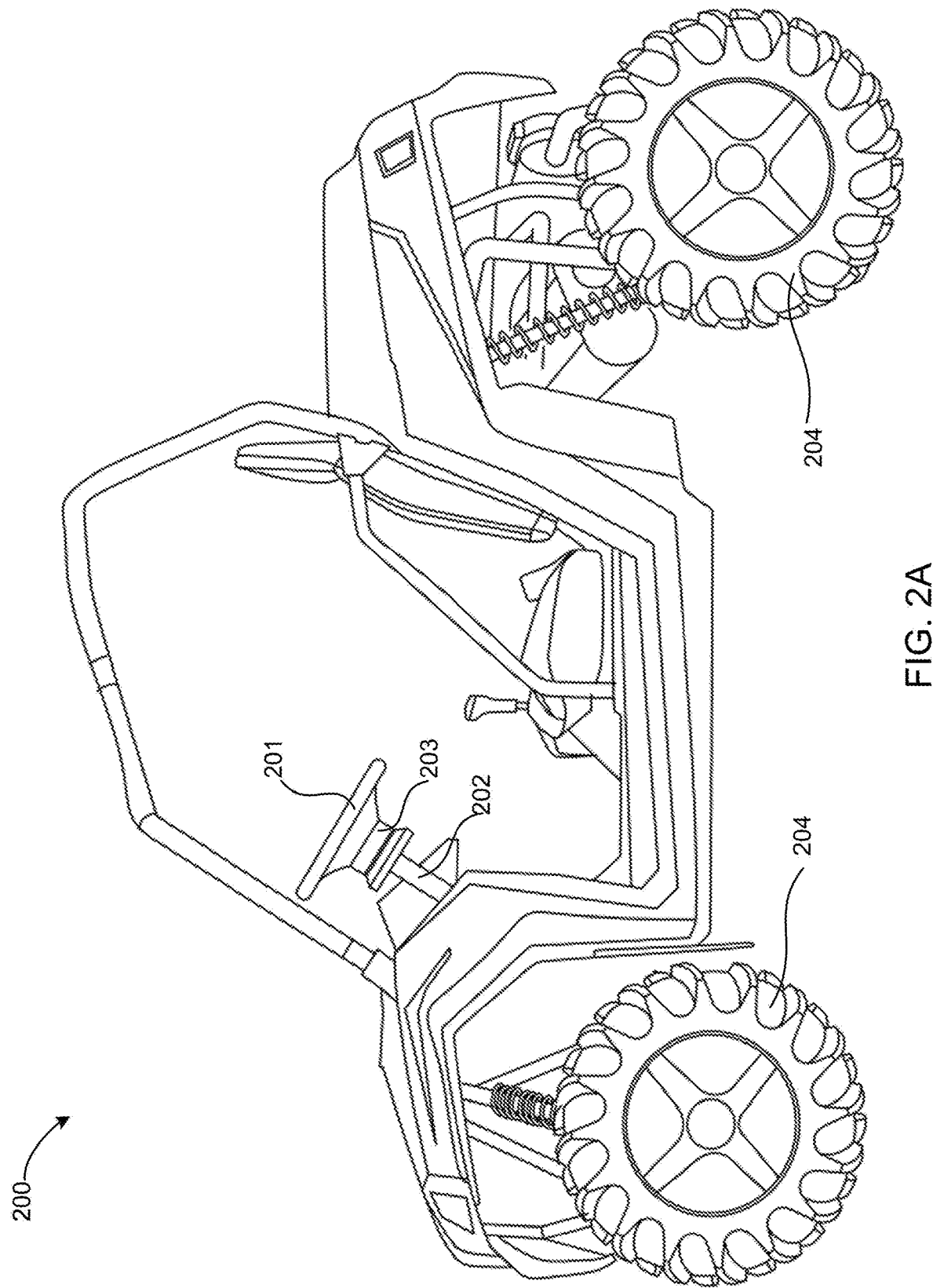

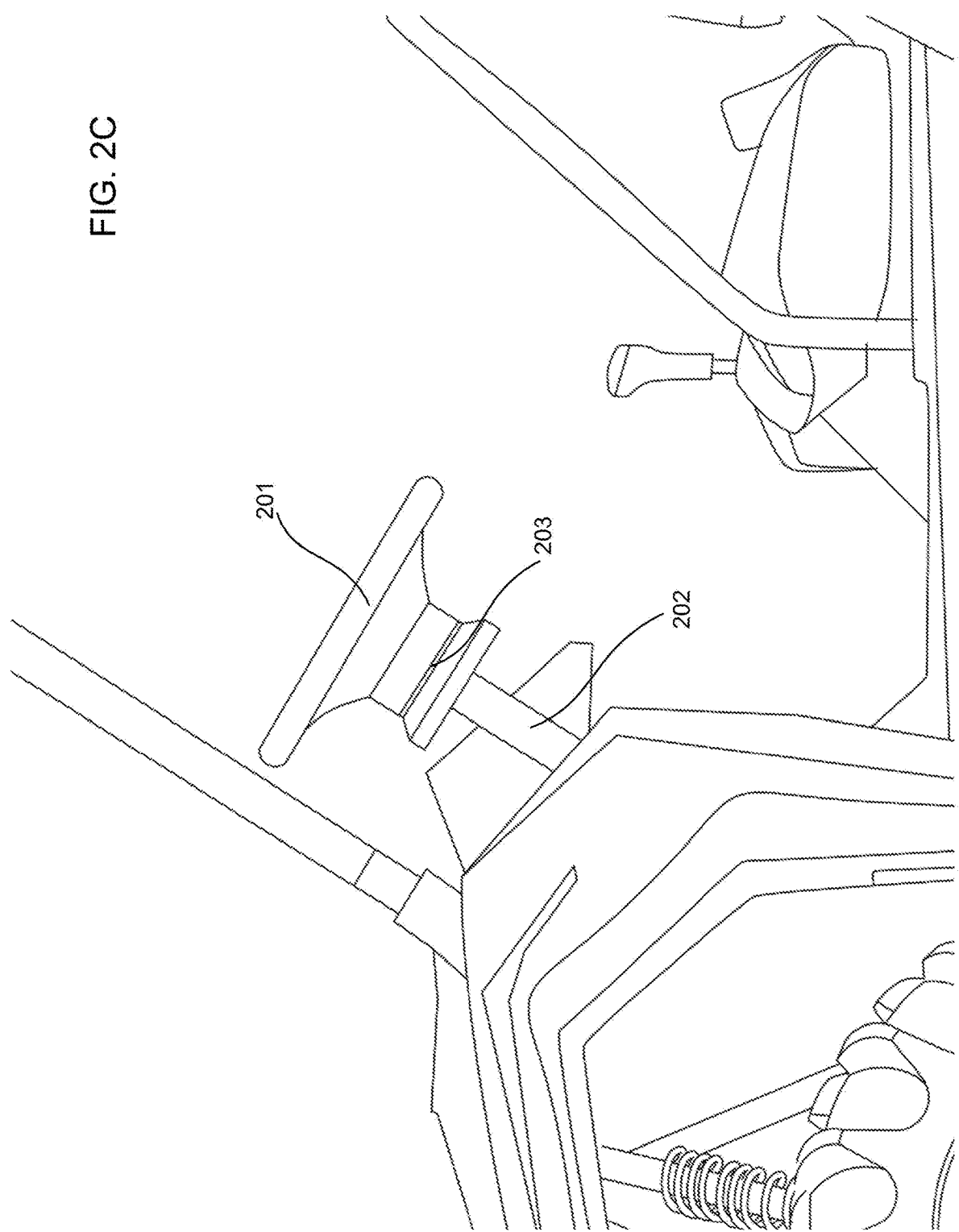

BIG AIR CONTROL APPARATUS

TECHNICAL FIELD

This invention relates generally to the field of power sports, and more specifically to directional control of vehicles.

BACKGROUND

One of the most popular and exhilarating stunts in off-road vehicle driving is catching air off a jump. Unfortunately, once the vehicle is in the air, the driver loses significant control of the vehicle. Skilled riders and drivers regain some control by manipulating the brakes and throttle to adjust the orientation of the vehicle. However, such skill requires intensive training to acquire, and thus are out of the reach of many recreational drivers and riders. Additionally, vehicles with ABS systems lose significant control through braking. These issues have yet to be addressed.

SUMMARY OF THE INVENTION

Embodiments of a ground vehicle in-air pitch- and roll-change apparatus are described herein that address at least some of the issues described above in the Background. The apparatus may include a steering input mechanism, a support structure, and an articulator. The apparatus may include one or more of a pitch-forward input mechanism, a pitch-back input mechanism, a roll-right input mechanism, and a roll-left input mechanism. The vehicle may include a set of wheels on which the vehicle travels over ground. The steering input mechanism may receive steering inputs from a driver or non-driver of the vehicle. The steering input mechanism may receive pitch and roll control inputs from the driver. The support structure may connect the steering input mechanism to the vehicle, at least one of the wheels, or the vehicle and the at least one of the wheels. The articulator may rotatably connect the steering input mechanism to the support structure.

In various embodiments, the articulator may enable rotation of the steering input mechanism about one or more axes parallel to the steering input mechanism. One or more of the pitch-forward, pitch-back, roll-right, or roll-left input mechanisms may be disposed adjacent to the steering input mechanism. Rotation of the steering input mechanism about at least one of the axes may activate one or more of said mechanisms. Activation of one or more of said mechanisms may cause transmission of one or more electrical signals. Said electrical signals may cause adjustment of the rotational speed of one or more wheels of the set of wheels.

In various embodiments, the articulator may enable rotation of the steering input mechanism about at least two axes parallel to the steering input mechanism. The pitch-forward input mechanism may be disposed adjacent to the steering input mechanism. The pitch-back input mechanism may be disposed adjacent to the steering input mechanism. The pitch-forward and pitch-back input mechanisms may each be disposed on opposite sides of the steering input mechanism from each other. Rotation of the steering input mechanism about a first axis of the axes may activate the pitch-forward or pitch-back input mechanism. The roll-right input mechanism may be disposed adjacent to the steering input mechanism. The roll-left input mechanism may be disposed adjacent to the steering input mechanism. The roll-right and roll-left input mechanisms may each be disposed along a side of the steering input mechanism between the pitch-forward and pitch-back mechanisms. The roll-right and roll-left input mechanisms may each be disposed on opposite sides of the steering input mechanism from each other. Rotation of the steering input mechanism about a second axis of the axes may activate the roll-right or roll-left input mechanism. Activation of at least one of said mechanisms may adjust a rotational speed of one or more of the wheels.

The steering input mechanism may include a panel. The panel may connect the steering input mechanism to the articulator. One or more of said mechanisms may include a button. The button may be disposed on the support structure and/or between the support structure and the steering input mechanism panel. The button may be attached to the support structure, the panel, or both. The button may be electrically connected to an electronic control unit. The electronic control unit may store instructions to adjust the rotational speed of the one or more of the wheels upon receiving a signal from the button.

The pitch-forward input mechanism may be disposed above a portion where the articulator connects to the support structure. The pitch-back input mechanism may be disposed below said position. The pitch-forward input mechanism may be disposed below said position. The pitch-back mechanism may be disposed above said position. The roll-right input mechanism may be disposed to the right of said position. The roll-left input mechanism may be disposed to the left of said position.

The articulator may include a compressible panel. One or more of said mechanisms may include a button disposed within the articulator. The button may be electrically connected to an electronic control unit. The electronic control unit may store instructions to adjust the rotational speed of the one or more wheels of the set of wheels. The apparatus may further include a retractable solenoid. The support structure may include a steering column. The retractable solenoid may be disposed within the steering column, across the articulator, and into the steering input mechanism. The solenoid may prevent rotation of the steering input mechanism about the at least one of the axes parallel to the steering input mechanism.

Activation of the pitch-forward mechanism may slow the rotational speed of all the wheels of the set of wheels. Activation of the pitch-forward mechanism may slow the rotational speed of a forward subset of the set of wheels. Activation of the pitch-forward mechanism may slow the rotational speed of a rear subset of the set of wheels. Activation of the pitch-back mechanism may increase the rotational speed of all the wheels of the set of wheels. Activation of the pitch-back mechanism may increase the rotational speed of the forward subset. Activation of the pitch-back mechanism may increase the rotational speed of the rear subset. Activation of the roll-right mechanism may slow the rotational speed of a right subset of the set of wheels. Activation of the roll-right mechanism may increase the rotational speed of a left subset of the wheels. Activation of the roll-right mechanism may slow the rotational speed of the right subset and increase the rotational speed of the left subset. Activation of the roll-left mechanism may increase the rotational speed of the right subset. Activation of the roll-left mechanism may slow the rotational speed of the left subset. Activation of the roll-left mechanism may increase the rotational speed of the right subset and slow the rotational speed of the left subset.

Embodiments of a ground vehicle are also described herein that address at least some of the issues described above in the Background. The vehicle may include one or more wheels, a steering mechanism, a throttle control, a brake control, and/or one or more of a pitch-forward, a pitch-back, a roll-right and a roll-left mechanism. The vehicle may travel over ground on the one or more wheels. The steering mechanism may adjust a tilt of at least one of the wheels relative to the vehicle. The throttle control may increase a rotational speed of at least one of the wheels. The brake control may decrease the rotational speed of the at least one of the wheels. The brake control may decrease the rotational speed of one or more others of the wheels. The brake control may decrease the rotational speed of the at least one of the wheels and the one or more others of the wheels. Activation of any of the pitch-forward, pitch-back, roll-right and roll-left mechanisms may adjust one or more of said rotational speeds according to a desired in-air pitch, roll or pitch and roll of the vehicle.

The ground vehicle may include an electronic control unit. The electronic control unit may store at least one of the desired in-air pitch and roll of the vehicle. The ground vehicle may include one or more yaw rate sensors. The yaw rate sensors may be electronically connected to the electronic control unit. The ground vehicle may include a visual display. The visual display may be electronically connected to the electronic control unit. The yaw rate sensors may measure a current pitch, roll, or pitch and roll of the vehicle. The visual display may display to a user of the vehicle a difference between the desired in-air pitch, roll or pitch and roll of the vehicle and the current pitch, roll or pitch and roll of the vehicle.

One or more of said pitch and/or roll mechanisms may include an electronic control unit. One or more of said pitch and/or roll mechanisms may include one or more yaw rate sensors. One or more of said pitch and/or roll mechanisms may include programming stored on the electronic control unit that, when executed, compares a current pitch, roll or pitch and roll to the desired pitch, roll or pitch and roll stored on the electronic control unit. The programming, when executed, may adjust said rotational speeds automatically until the current pitch, roll or pitch and roll matches the desired pitch, roll or pitch and roll.

One or more of said mechanisms may include electronic buttons. The buttons may be disposed on the steering input mechanism. The buttons may be electronically connected to an electronic control unit. The electronic control unit may store the desired in-air pitch, roll or pitch and roll of the vehicle.

BRIEF DESCRIPTION OF THE DRAWINGS

A more particular description of the apparatus summarized above is made below generally and by reference to specific embodiments. Several embodiments are depicted in drawings included with this application, in which:

FIGS. 2A-C depict various views of an embodiment of a ground vehicle, similar to that depicted in FIGS. 1A-C, incorporating a second embodiment of an apparatus as described herein;

DETAILED DESCRIPTION

A detailed description of embodiments of an apparatus is provided below by example, with reference to embodiments in the appended figures. Those of skill in the art will recognize that the features of the apparatus as described by example in the figures below could be arranged and designed in a variety of different configurations without departing from the scope of the claims. Thus, the detailed description below and the depictions of embodiments in the figures is representative of the apparatus described in the claims, and is not intended to limit the scope of the claims.

Figure 1A:
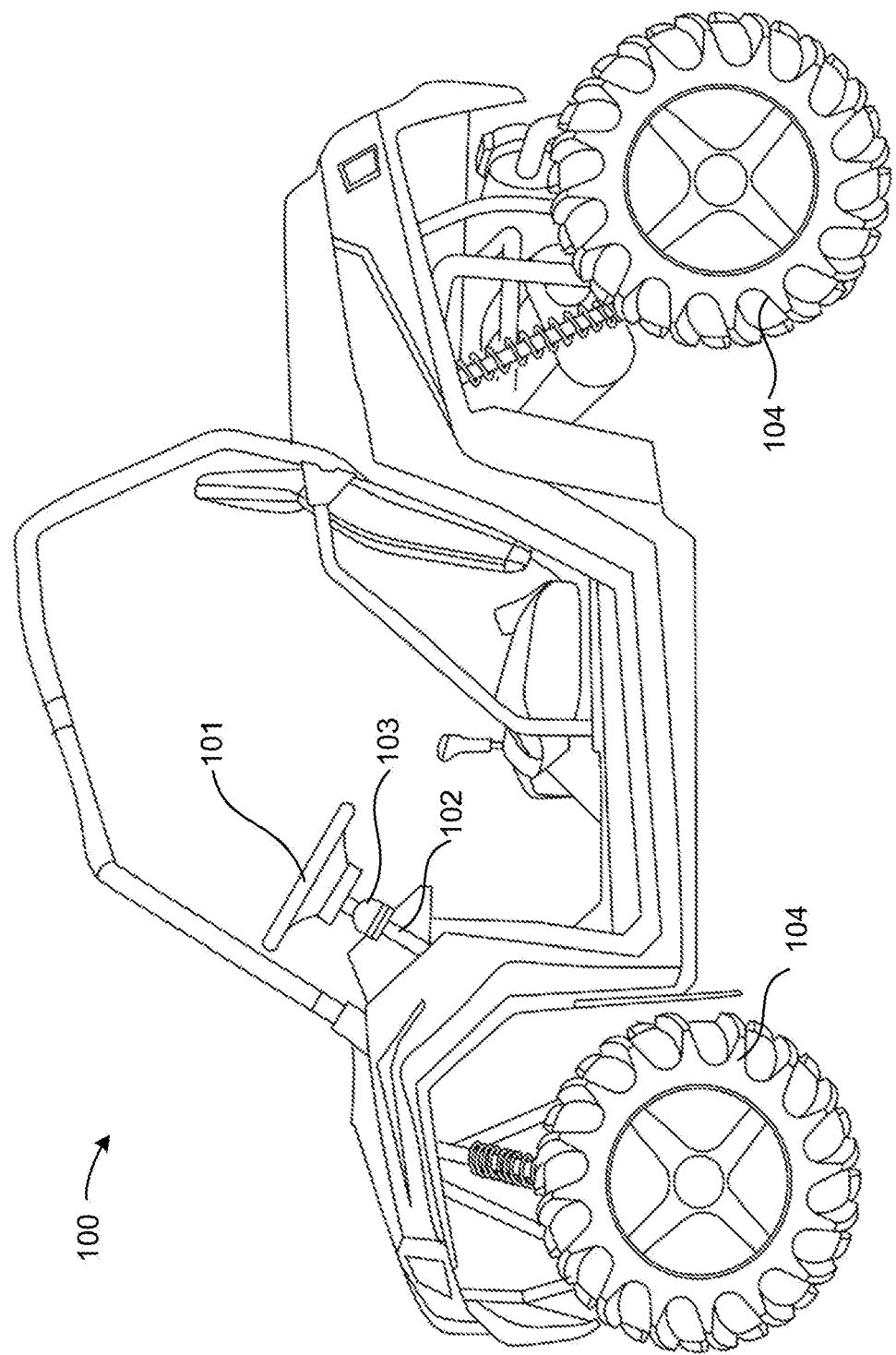
FIGS. 1A-C depict various views of one embodiment of a ground vehicle that incorporates one embodiment of an apparatus as described herein.
Figure 1B:
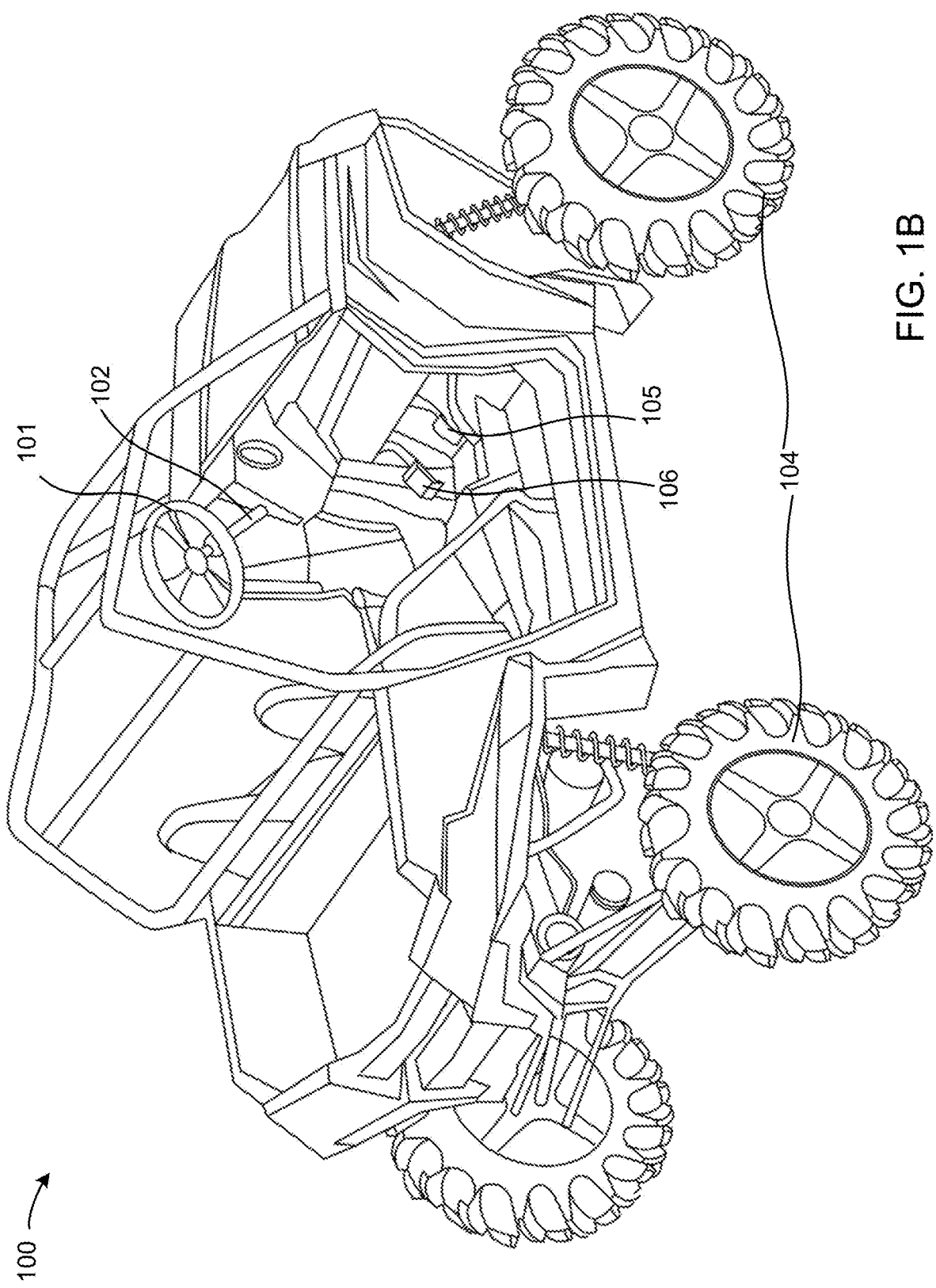
Figure 1C:
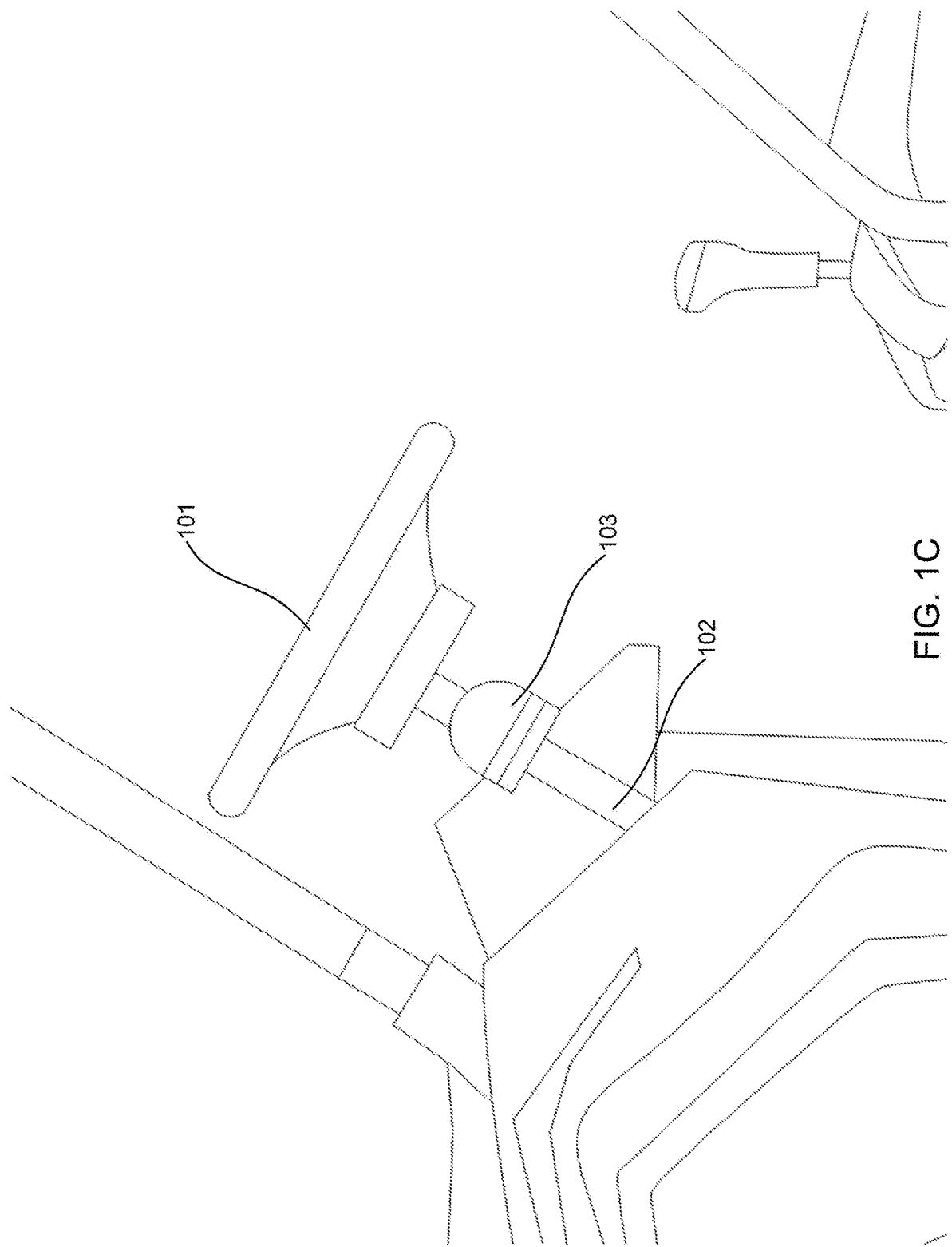

FIGS. 1A-C depict various views of one embodiment of a ground vehicle that incorporates one embodiment of an apparatus as described herein. The ground vehicle 100 includes a steering input mechanism 101, a support structure 102, an articulator 103, wheels 104, a throttle control 105, and a brake control 106. Although not depicted in detail (shown in more detail with regard to other FIGs. and described below), the articulator 103 may include a pitch-forward input mechanism, a pitch-back input mechanism, a roll-right input mechanism, and/or a roll-left input mechanism. The vehicle 100 travels over ground on the wheels 104. The steering input mechanism 101 receives steering inputs from a driver or non-driver of the vehicle and adjusts a tilt of the front wheels 104 relative to the vehicle 100. The non-driver may be in or outside the vehicle, or a computer control system in communication with sensors within the vehicle. The throttle control 105 increases a rotational speed of the wheels 104 (in this case, the vehicle 100 is all-wheel-drive, though in various embodiments the vehicle 100 may be rear-wheel or front-wheel-drive). The brake control 106 decreases the rotational speed of the wheels. The brake control 106 may decrease the rotational speed of the front wheels 104, the rear wheels 104, any single wheel 104, or combinations thereof.

The steering input mechanism 101 may receive pitch and roll control inputs from the driver or a non-driver, which inputs are transmitted via the articulator 103 to the pitch and roll input mechanisms. The non-driver may be in or outside the vehicle, or a computer control system in communication with sensors within the vehicle. The non-driver may be in visual communication with the vehicle and in radio communication with the steering input mechanism of the vehicle. The support structure 102 connects the steering input mechanism 101 directly to the vehicle 100 and indirectly to the wheels 104 via, for example, a power steering assembly and a rack and pinion. The articulator 103 rotatably connects the steering input mechanism 101 to the support structure such that the steering input mechanism 101 rotates about at least one axis parallel to the steering input mechanism 101 and freely from the support structure 102 while remaining rotatably fixed to the support structure 102 about an axis coaxial with the support structure 102 and the steering input mechanism 101.

The vehicle 100 may include an electronic control unit, one or more yaw rate sensors, and/or a visual display. The electronic control unit may store at least one of a desired in-air pitch and roll of the vehicle. The yaw rate sensors and/or visual display may be electronically connected to the electronic control unit. The yaw rate sensors may measure a current pitch, roll, or pitch and roll of the vehicle. The visual display may display to a user of the vehicle a difference between the desired in-air pitch, roll or pitch and roll of the vehicle and the current pitch, roll or pitch and roll of the vehicle. The vehicle may further include one or more of a pitch-forward, a pitch-back, a roll-right, and a roll-left mechanism. Activation of any of the pitch-forward, pitch-back, roll-right and roll-left mechanisms may adjust one or more of said rotation speeds according to a desired in-air pitch, roll or pitch and roll of the vehicle.

Alternatively, a pitch and/or roll mechanism incorporated into the vehicle 100 may include an electronic control unit and/or one or more yaw rate sensors. The pitch and/or roll mechanism may include programming stored on the electronic control unit that, when executed, compares a current pitch, roll or pitch and roll to the desired pitch, roll or pitch and roll stored on the electronic control unit. The programming, when executed, may adjust the rotational speeds of the appropriate wheels automatically until the current pitch, roll or pitch and roll matches the desired pitch, roll or pitch and roll.

In various embodiments, the pitch and/or roll mechanisms may comprise buttons on the steering input mechanism 101. The buttons may be on a front face of the steering wheel or a back face of the steering wheel. A driver of the vehicle 100 may activate the mechanisms while still holding the steering input mechanism 101 by pressing the button or buttons corresponding to a desired change in pitch and/or roll of the vehicle 100.

In various embodiments, the pitch and/or roll mechanisms may comprise one or more strain gauges. Such strain gauges may be placed inside a compressible pad that forms at least part of the articulator 103.

Figure 2B:
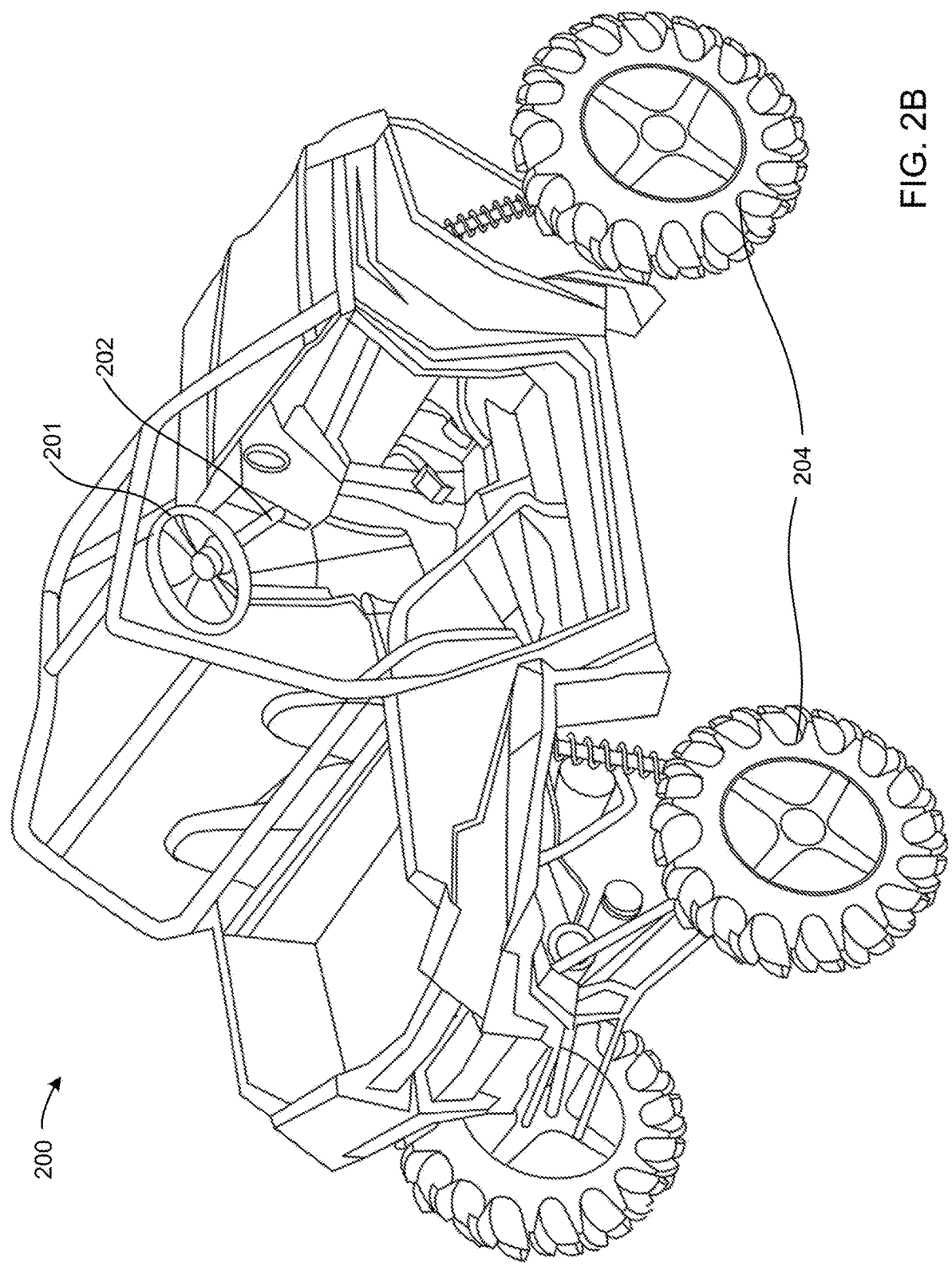

FIGS. 2A-C depict various views of an embodiment of a ground vehicle, similar to that depicted in FIGS. 1A-C, incorporating a second embodiment of an apparatus as described herein. The ground vehicle 200 includes a steering input mechanism 201, a support structure 202, an articulator 203, and wheels 204. Although not depicted in detail (shown in more detail with regard to other FIGs. and described below), the articulator 203 may include a pitch-forward input mechanism, a pitch-back input mechanism, a roll-right input mechanism, and a roll-left input mechanism. The articulator 203 differs from the articulator 103 in structure as described more below regarding other FIGs.

The ground vehicles 100 and 200 depict examples of vehicles into which the apparatus as described herein may be integrated. In general, a vehicle in which the apparatus may be used is a land craft. The steering requirements of land crafts (e.g., the ground vehicles 100 and 200), water crafts, and air crafts differ dramatically. In water crafts, left-right steering is controlled by a rudder connected to a helm. The pitch and roll of water crafts is controlled by adjusting the speed of the water craft and direction of the rudder. In air crafts, pitch, roll and yaw are controlled by a yoke connected to a rudder and ailerons. The yoke is turned, pulled and pushed. In land crafts, the only means of adjusting the pitch of the land craft in-air has been to adjust the speed of the wheels in-air, which is done using the brake and throttle. There has so far been no means, other than take-off angle, to control the roll of the land craft. This has been the cause of many serious accidents and injuries in power sports. Thus, a solution has been needed to provide more natural control of land craft in-air. The articulator and pitch and roll input mechanisms as described herein present such a solution, which has not previously been presented, and which solves a long-felt need in the power sports industry. To address these problems, the present inventors have developed a steering input mechanism (i.e. steering wheel) that is twisted about axes parallel to a face of the steering input mechanism to adjust the pitch and roll of the vehicle.

The steering input mechanisms 101 and 201 may take any of a variety of shapes and/or forms. In the depicted embodiments, the steering input mechanisms are circular spoke-and-hub assemblies. However, in various other embodiments, the steering input mechanism may comprise a variety of other shapes, such as x-shaped and/or rectangular. The steering input mechanism may comprise a variety of controls and/or indicators integrated into the steering input mechanism, such as in Formula 1 or Indycar steering wheels. In various embodiments, the pitch and roll input mechanisms may be integrated into the hub and/or spokes of the steering input mechanism as push-buttons. The steering input mechanism may enable a driver or non-driver of the vehicle to turn one or more of the wheels of the vehicle to change the lateral direction of travel of the vehicle on-ground. The steering input mechanism may also enable a driver or non-driver of the vehicle to adjust the rotational speed of one or more of the wheels, such as via the pitch and roll mechanisms described herein. The non-driver may be in or outside the vehicle, or a computer control system in communication with sensors within the vehicle. The non-driver may be in visual communication with the vehicle and in radio communication with the steering input mechanism of the vehicle.

The support structures 102 and 202, as depicted, are steering columns connecting the steering input mechanisms 101, 201, respectively, to power steering and rack and pinion assemblies. However, in various embodiments, the support structures may take a variety of different forms. For example, in some embodiments, the steering system is electronic, wherein the wheels are turned by electronically actuated pistons, servos, rotors, etc. The steering input mechanism may not require physical connection to the wheels, but merely an electronic connection. In such embodiments, the support structure may comprise, for example, the dash board of the vehicle and/or various components connected to the dash board and the steering input mechanism and extending the steering input mechanism from the dash board.

The articulators 103 and 203 are described in more detail below regarding other FIGs., but generally enable rotation of the steering input mechanism about one or more axes independently of the support structure while still allowing rotation of the steering input mechanism with the support structure, or independently of the support structure, about an axis coaxial with the steering input mechanism.

The wheels 104 and 204 are connected to the vehicles 100 and 200, respectively, by various suspension and/or drive components, and allow for travel of the vehicles over ground. The wheels may be comprised of pneumatically-inflated rubber tires around steel and/or alloy wheels and connected to wheel hubs. Alternatively, the wheels may include non-pneumatic tire structures such as rubberized honeycomb structures.

Figure 3:
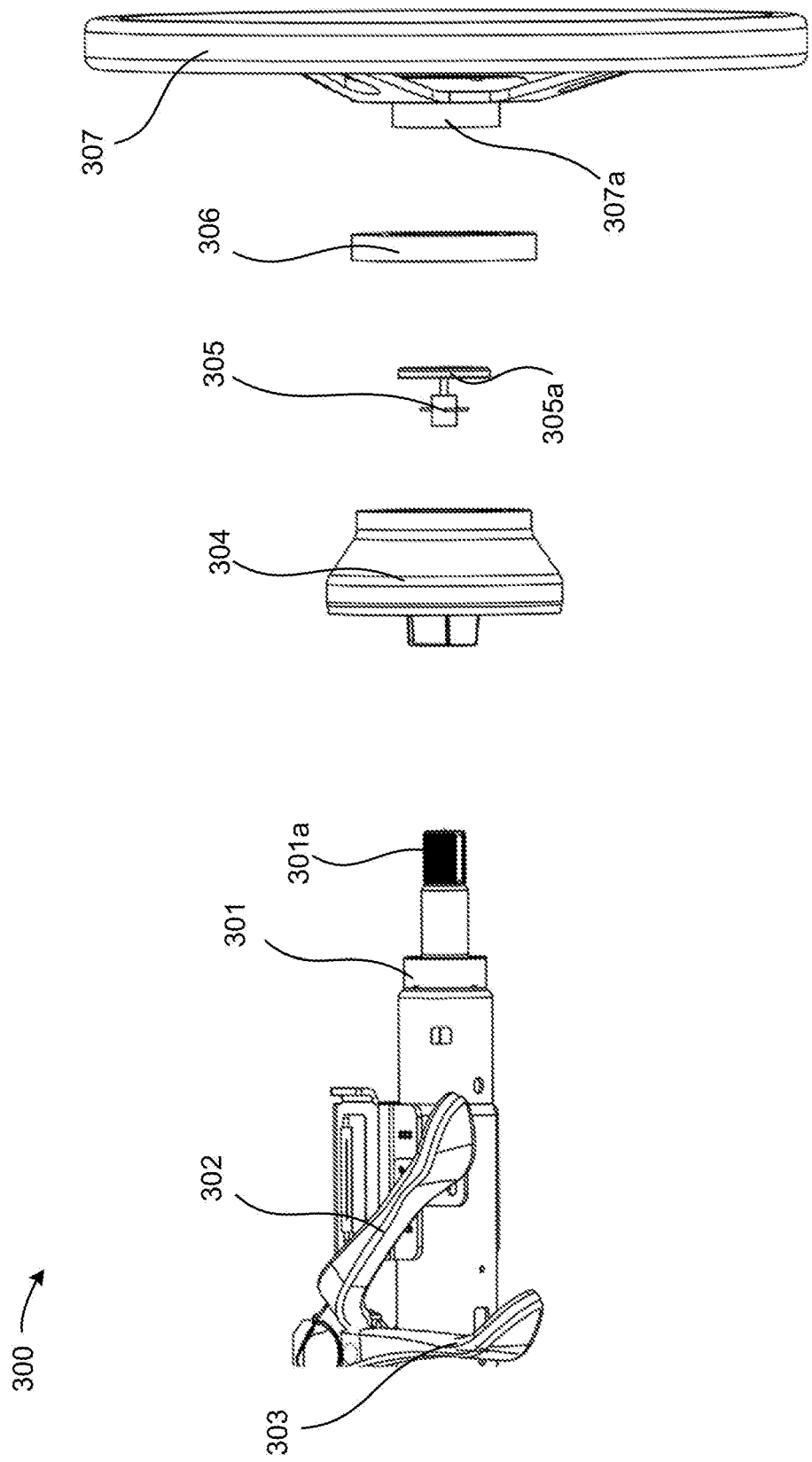
FIG. 3 depicts an exploded view of a portion of a steering assembly for adjusting the in-air pitch and roll of a ground vehicle.

FIG. 3 depicts an exploded view of a portion of a steering assembly for adjusting the in-air pitch and roll of a ground vehicle. The assembly 300 includes a steering column 301, a steering column tilt lever 302, a steering column telescope lever 303, a steering wheel hub 304, a solenoid 305, an articulator 306, and a steering wheel 307. The steering column 301 includes a toothed shaft 301a that inserts into the steering wheel hub 304. The solenoid 305 is mounted within the steering wheel hub 304, and includes piston 305a.

The piston 305a extends from the steering wheel hub 304, through the articulator 306, and into a base 307a of the steering wheel 307 (e.g. a panel where steering wheel spokes converge). The articulator 306 connects the steering wheel base 307a to the steering wheel hub 304.

The articulator 306 comprises a thick, compressible pad. The pad may support the weight of the steering wheel 307 without compressing, but may compress under an additional force on the steering wheel 307, such as a force exerted on the steering wheel that may compress an outer edge of one side of the pad. One or more of a pitch-forward, pitch-back, roll-right, or roll-left input mechanisms may be disposed adjacent to the steering wheel 307 within the pad. For example, the mechanisms may include electronic buttons. The electronic buttons may be connected to a vehicle electronic control unit via electrical wiring. The electronic control unit may store instructions to adjust the rotational speed of the one or more of the wheels. Rotation of the steering wheel about at least one axis parallel to the steering wheel 307 may activate one or more of said mechanisms. Activation of one or more of said mechanisms may cause transmission of one or more electrical signals. Said electrical signals may cause adjustment of the rotational speed of one or more wheels of the vehicle. Further description of such a system is described in U.S. patent application Ser. No. 15/491,196 by David R. Hall et al. on Apr. 19, 2017 entitled "Big Air Electronic Control Module," which is incorporated herein by reference. FIGS. 3A-5H and paragraphs [0041] to [0046] are particularly relevant, though the entirety of the disclosure is incorporated herein.

As is described in the above-referenced application, the speed of any of the wheels may be adjusted to adjust the pitch and/or roll of the vehicle as the vehicle is in-air. As described herein, activation of the various pitch and roll mechanisms may cause transmission of electronic signals that may cause such speed adjustments. Activation of a pitch-forward mechanism disposed within the articulator 306 above the base 307a may slow the rotational speed of all the wheels of the vehicle, a forward subset of the wheels, or a rear subset of the wheels. Activation of a pitch-back mechanism disposed within the articulator 306 below the base 307a may increase the rotational speed of all the wheels of the vehicle, of the forward subset, or of the rear subset. Activation of a roll-right mechanism disposed in the articulator 306 to the right of the base 307a may slow the rotational speed of a right subset of the wheels, may increase the rotational speed of a left subset of the wheels, or may slow the rotational speed of the right subset and increase the rotational speed of the left subset. Activation of a roll-left mechanism disposed in the articulator 306 to the left of the base 307a may increase the rotational speed of the right subset, slow the rotational speed of the left subset, or may increase the rotational speed of the right subset and slow the rotational speed of the left subset.

The pitch and roll mechanisms may comprise electronic buttons disposed within the compressible pad of the articulator 306. Activation of the mechanisms may be accomplished by: exerting a force on a top portion of the steering wheel 307, which will cause a top portion of the articulator 306 to compress and compress the pitch-forward button; exerting a force on a bottom portion of the steering wheel 307, which will cause a bottom portion of the articulator 306 to compress and compress the pitch-back button; exerting a force on a right portion of the steering wheel 307, which will cause a right portion of the articulator 306 to compress and compress the roll-right button; and/or exerting a force on a left portion of the steering wheel 307, which will cause a left portion of the articulator 306 to compress and compress the roll-left button. A force exerted on a portion of the steering wheel 307 between portions corresponding to the pitch and roll buttons may compress two buttons. Additionally, in some embodiments, a force on the top portion of the steering wheel 307 may activate the pitch-back mechanism, and a force on a bottom portion of the steering wheel 307 may activate the pitch-forward mechanism.

The steering wheel hub 304 and the steering column 301 may form the support structure for the steering wheel 307 and the articulator 306. In various embodiments, the pitch and roll input mechanisms may be disposed on the support structure, such as the steering wheel hub 304, between the steering wheel hub 304 and the steering wheel base 307a, and outside the articulator 306. Alternatively, the pitch and roll input mechanisms, such as electronic buttons, may be similarly positioned but connected directly to the steering wheel base 307a. Activation of the mechanisms may occur in a similar fashion as described in the preceding paragraph.

Figure 4:
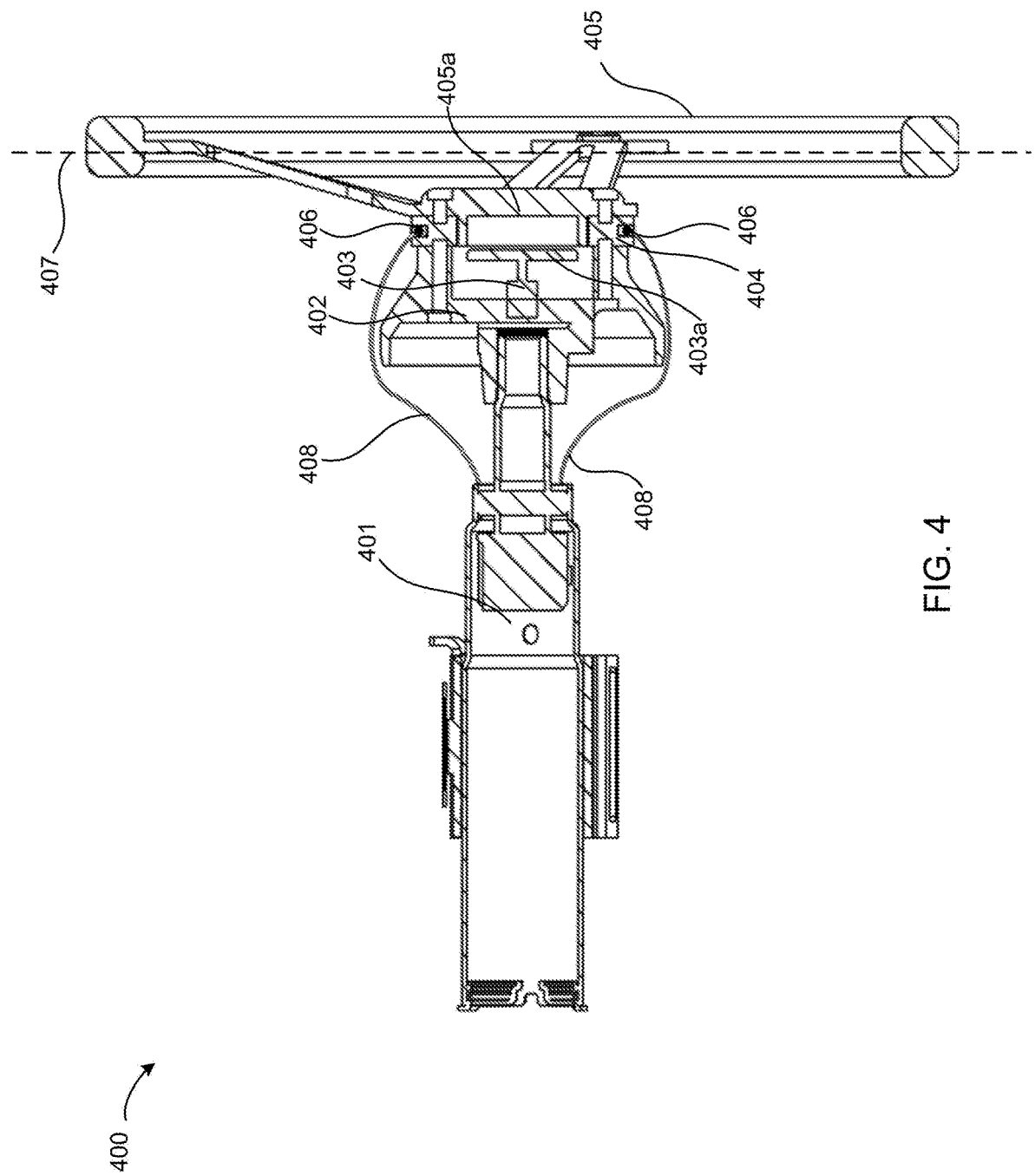
FIG. 4 depicts a cross-sectional view of a steering assembly for adjusting the in-air pitch and roll of a ground vehicle.

The articulator 306 may be comprised of one or more of a variety of materials, including neoprene, styrene butadiene, polyurethane, ABS, PVC, Teflon, silicone, and others. The pitch and roll mechanisms may be inserted into the articulator 306 by cutting or otherwise forming slits and/or cuts in the outer circumference of the articulator 306 and into the interior volume of the articulator 306. The mechanisms may then be placed into the slits/cuts, and wiring from the mechanisms may extend from the slits/cuts and down the steering column 301. [40] FIG. 4 depicts a cross-sectional view of a steering assembly for adjusting the in-air pitch and roll of a ground vehicle. The steering assembly 400 includes a steering column 401, a steering wheel hub 402, a solenoid 403, an articulator 404, a steering wheel 405, and pitch and roll mechanisms 406. As shown, the solenoid is directly connected to the steering wheel hub 402, and passes into a base 405a of the steering wheel. The base 405a extends into the articulator 404, and a piston 403a of the solenoid extends into the base 405a. This prevents rotation of the steering wheel 405 about any axis parallel to the steering wheel 405 and the piston 403a, such as axis 407. Additionally, the pitch and roll mechanisms 406 are connected by wiring 408 to an electronic control unit of the vehicle.

Figure 5:
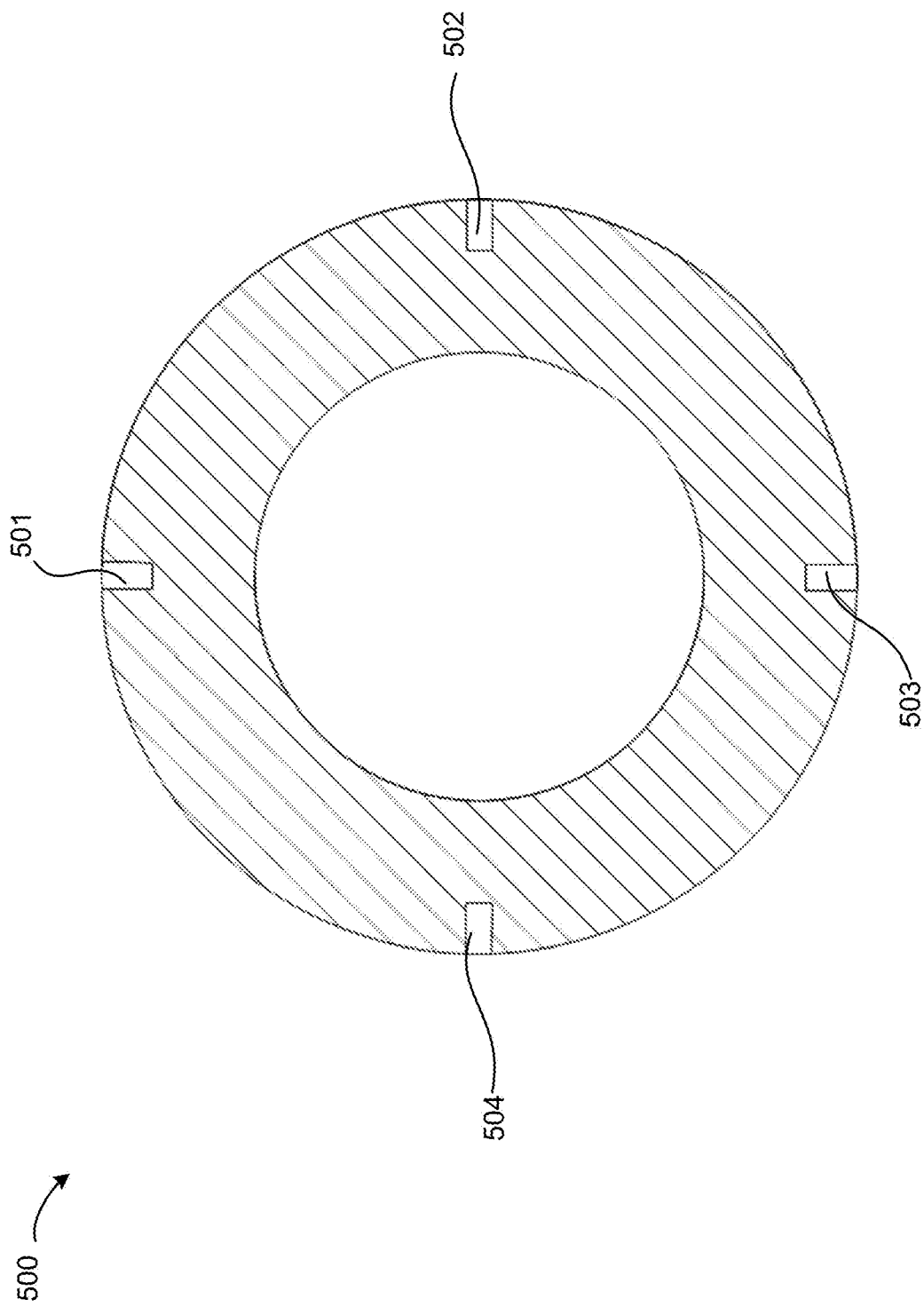
FIG. 5 depicts a cross-sectional view of a compressible-pad articulator embodiment.
Figure 6A:
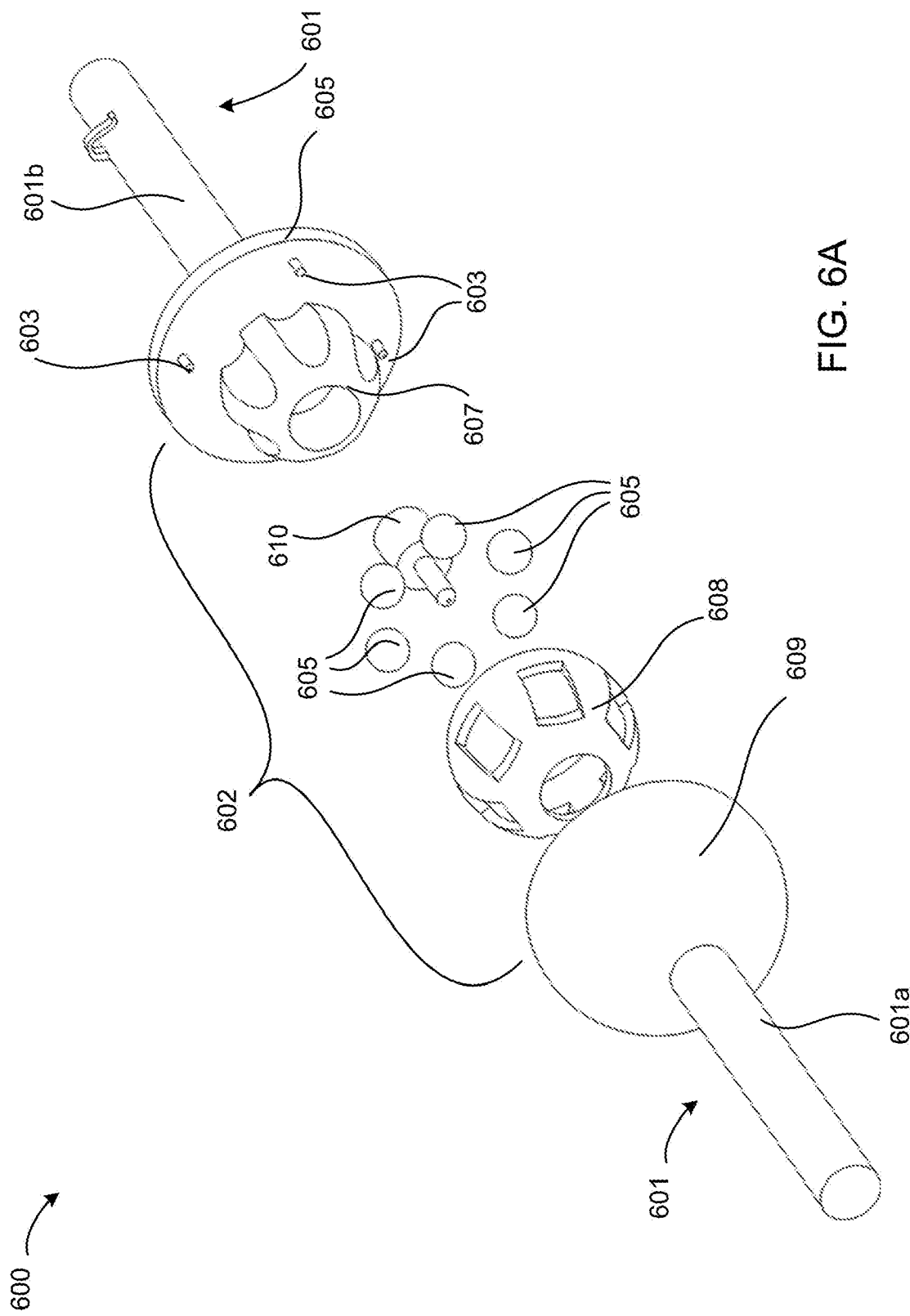
FIGS. 6A-D depict various views of a second embodiment of a steering assembly for adjusting the in-air pitch and roll of a ground vehicle.
Figure 6B:
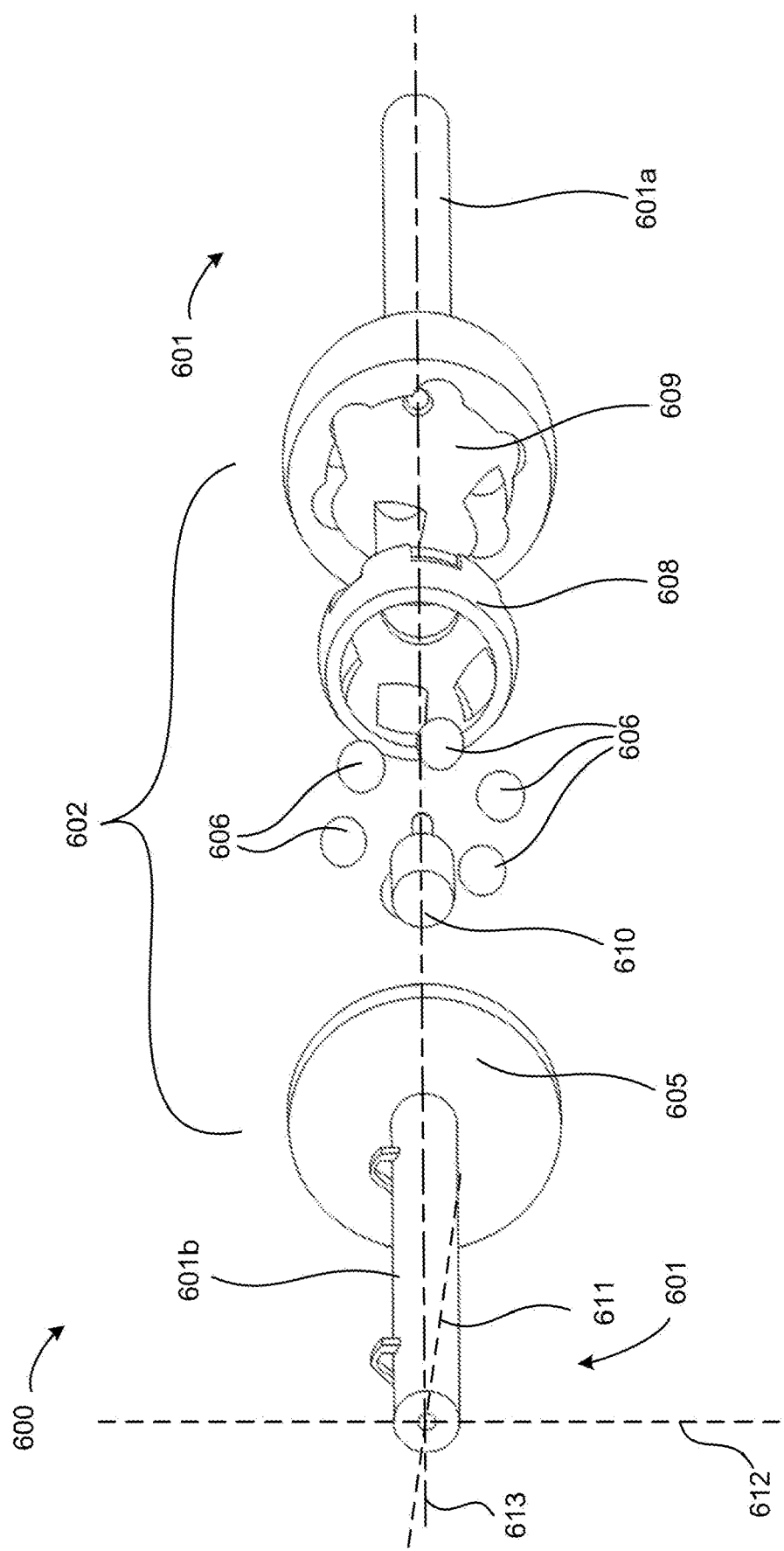
Figure 6C:
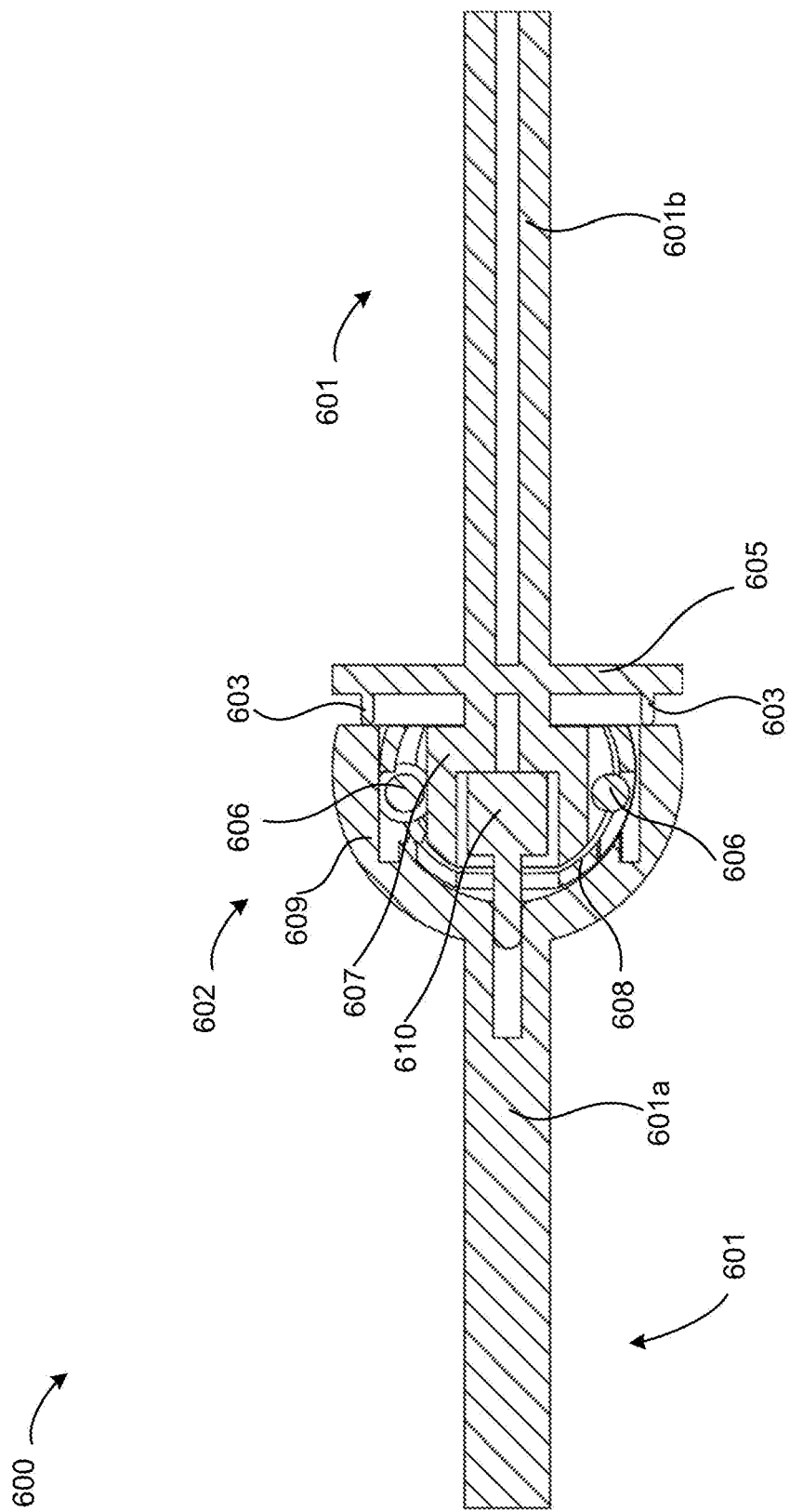
Figure 6D:
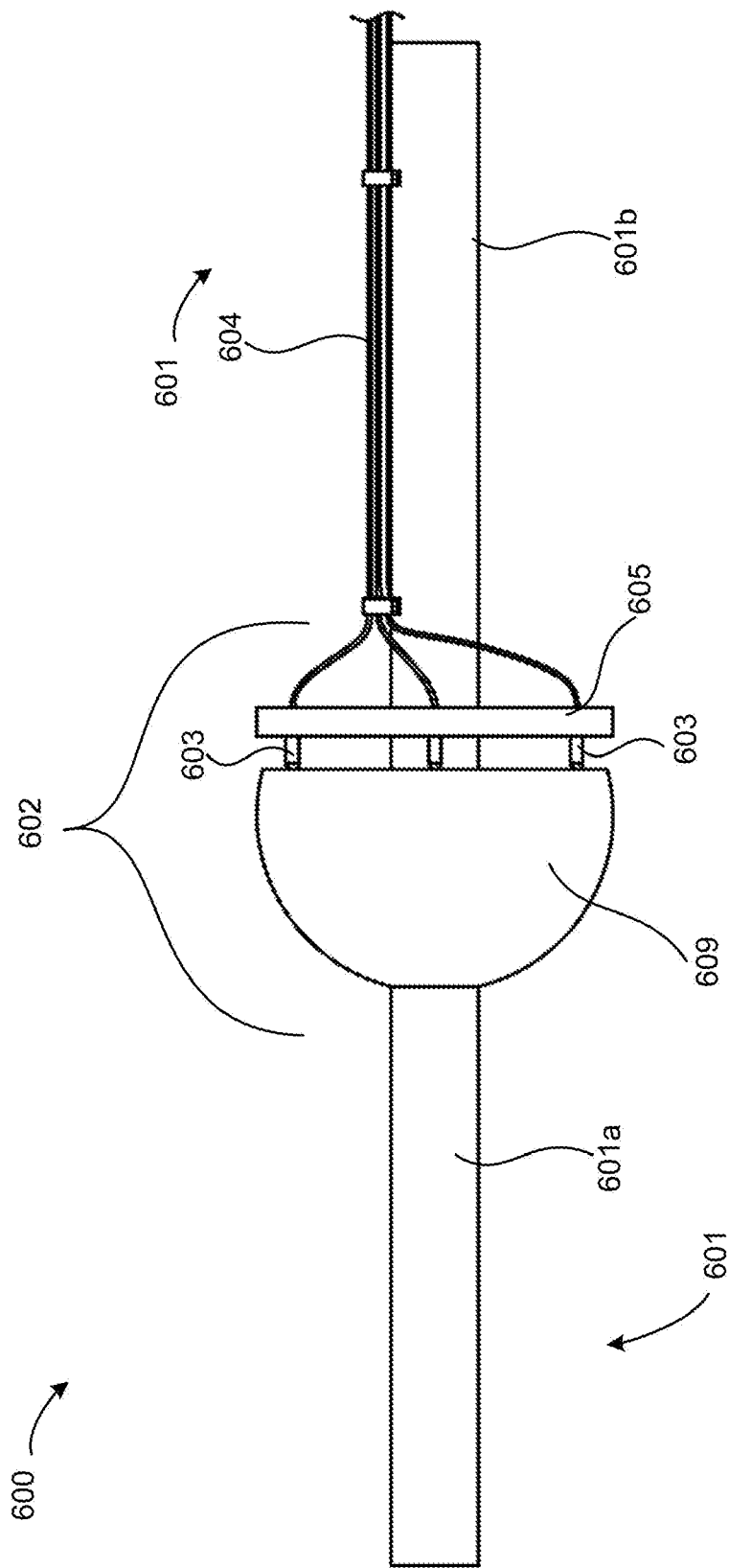

FIG. 5 depicts a cross-sectional view of a compressible-pad articulator embodiment. The pad 500 includes a first slot 501, a second slot 502, a third slot 503, and a fourth slot 504. Pitch and roll mechanisms are inserted into the slots, such as electronic buttons. The buttons may be fixed within the slots by pressure exerted by the compressible pad 500 against the buttons, or may be glued in the slots. In various embodiments, a silicon gel may be injected into the slots with the buttons to secure the buttons within the slots and still retain the compressibility of the slots around the buttons so that the buttons, in turn, may be compressed.

FIGS. 6A-D depict various views of a second embodiment of a steering assembly for adjusting the in-air pitch and roll of a ground vehicle. The assembly 600 includes a steering column 601, an articulator 602, pitch and roll control mechanisms 603, and wiring 604. The articulator includes a base plate 605, bearings 606, a slotted bearing base 607, a slotted bearing cage 608, a slotted bearing cap 609, and a solenoid 610. The solenoid is disposed within the base 607, with a piston extending through the cage 608 and cap 609, and into the steering column 601. The articulator 602 allows for rotation of a steering wheel connected to the steering column 601 about axes 611, 612 parallel to the steering wheel and transverse to the steering column 601, while preventing rotation of a top portion of the steering column 601a with respect to a bottom portion of the steering column 601b about a centerline axis 613. The slots in the base 607 and the cap 609 allow those components to slide with respect to each other and around the bearings when a force is exerted about one of the parallel axes 611, 612. However, the edge shapes of the slots in the base 607 and the cap 609 pin the bearings between the walls of the opposing slots and prevent independent movement when a force is exerted about the centerline axis 613.

Each of the slotted bearing base 607, the slotted bearing cage 608 and the slotted bearing cap 609 are semi-spherical, such that a cut-off end of each has a narrower diameter than the maximum diameter of the component over which it is disposed. Each of the slotted, semi-spherical components, and the bearings 606, may be comprised of a metal, such as steel, carbon steel, or aluminum. In one embodiment of assembling the components, the cage 608 is first superheated such that the cut-off end diameter is greater than the maximum diameter of the base 607. The bearings 606 are placed in the slots in the heated cage 608, and the base 607 is inserted into the cage 608 with the slots in the base 607 aligned with the bearings 606. The cage 608 is then cooled around the base 607 until the cut-off end diameter of the cage 608 is less than the maximum diameter of the base 607. A similar process is followed for placing the cap 609 around the cage 608 and base 607.

Figure 7:
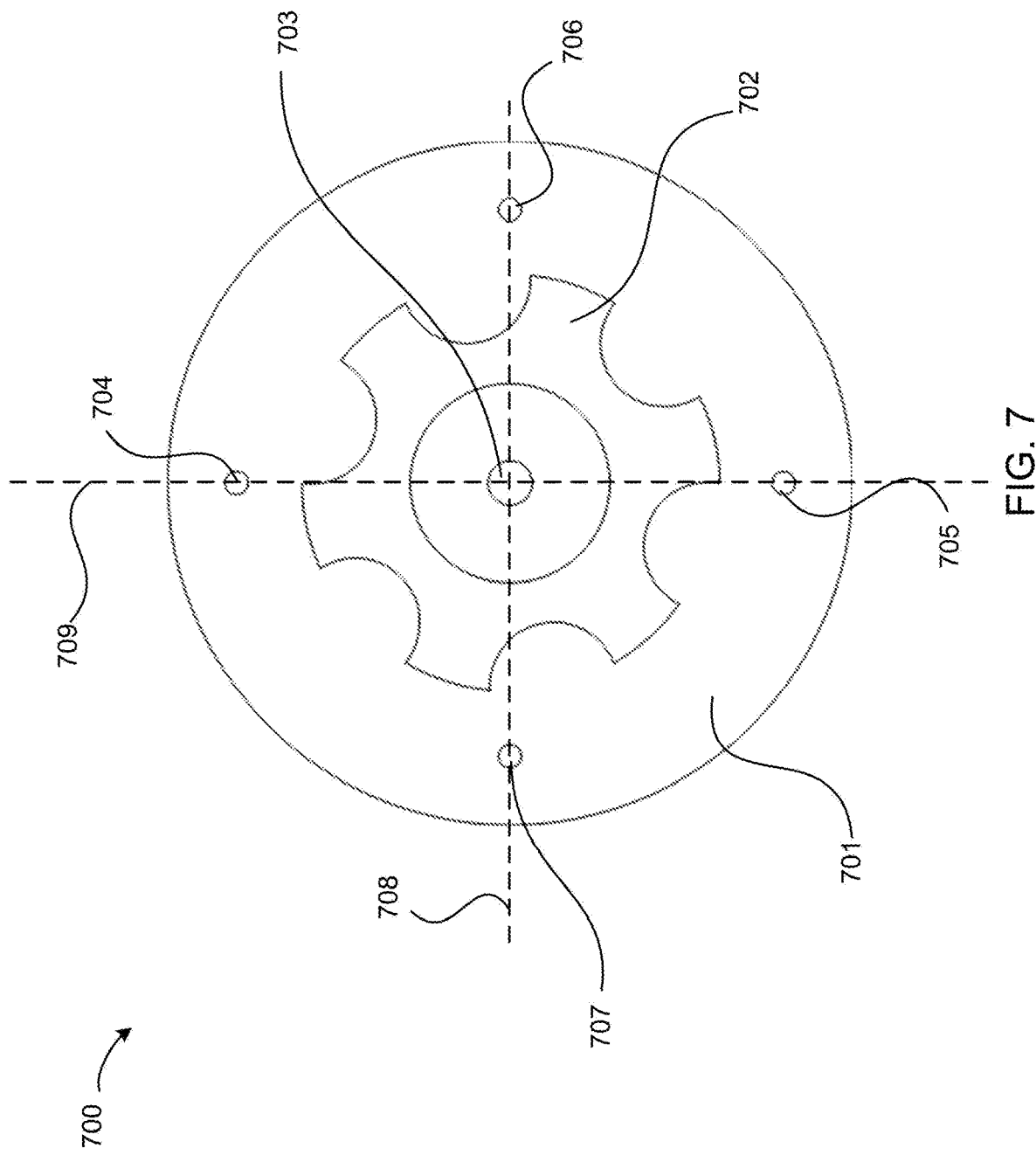
FIG. 7 depicts a front view of a portion of the articulator described above regarding FIGS. 6A-D.

FIG. 7 depicts a front view of a portion of the articulator described above regarding FIGS. 6A-D. The articulator 700 includes a base plate 701, a slotted bearing base 702, a solenoid piston 703, a pitch forward input mechanism 704, a pitch-back input mechanism 705, a roll-right input mechanism 706, and a roll-left input mechanism 707. As described herein previously, the articulator enables rotation of the steering wheel about at least two axes parallel to the steering wheel, such as a first axis 708, and a second axis 709. The bearing cap described with regard to the previous FIG. may be integrated into the steering wheel, such that the steering wheel spokes extend from the bearing cap. In such embodiments, the pitch-forward, pitch-back, roll-right and roll-left input mechanisms 704, 705, 706, 707 are disposed adjacent to the steering wheel. The pitch-forward input mechanism 704 is disposed on a side of the steering wheel opposite the pitch-back input mechanism 705. Rotation of the steering wheel about the first axis 708 activates the pitch-forward input mechanism 704 or the pitch-back input mechanism 705. The roll-right and roll-left input mechanisms 706, 707 may likewise be disposed along opposite sides of the steering wheel from each other, each disposed along a side of the steering wheel between the pitch-forward and pitch-back input mechanisms 704, 705. Rotation of the steering wheel about the second axis 709 activates the roll-right or roll-left input mechanism 706, 707.

We claim:

1. An apparatus that changes in-air pitch and roll angles of a ground vehicle, comprising:
    a steering input mechanism that receives steering inputs and pitch and roll control inputs from a driver of the vehicle;
    a support structure that connects the steering input mechanism to the vehicle, at least one wheel of a set of wheels on which the vehicle travels over ground, or the vehicle and the at least one wheel;
    an articulator that rotatably connects the steering input mechanism to the support structure and enables rotation of the steering input mechanism about at least two axes parallel to the steering input mechanism;
    a pitch-forward and a pitch-back input mechanism, each disposed adjacent to the steering input mechanism on opposite sides of the steering input mechanism from each other, wherein rotation of the steering input mechanism about a first axis of the axes activates the pitch-forward or pitch-back input mechanism; and
    a roll-right and a roll-left input mechanism, each disposed adjacent to the steering input mechanism along a side of the steering input mechanism between the pitch-forward and pitch back mechanisms, and each disposed on opposite sides of the steering input mechanism from each other, wherein rotation of the steering input mechanism about a second axis of the axes activates the roll-right or roll-left input mechanism,
    wherein activation of at least one of said mechanisms adjusts a rotational speed of one or more of the wheels.

2. The apparatus of claim 1, wherein the steering input mechanism comprises a panel connecting the steering input mechanism to the articulator, and wherein one or more of said mechanisms comprises a button disposed on the support structure between the steering input mechanism panel and the support structure.

3. The apparatus of claim 2, wherein the button is electrically connected to an electronic control unit, the electronic control unit storing instructions to adjust the rotational speed.

4. The apparatus of claim 1, wherein the pitch-forward input mechanism is disposed above a position where the articulator connects to the support structure and the pitch-back input mechanism is disposed below said position, or wherein the pitch-forward input mechanism is disposed below said position and the pitch-back input mechanism is disposed above said position.

5. The apparatus of claim 1, wherein the roll-right input mechanism is disposed to the right of a position where the articulator connects to the support structure and the roll-left input mechanism is disposed to the left of said position.

6. The apparatus of claim 1, wherein activation of the pitch-forward mechanism slows the rotational speed of all the wheels of the set of wheels, of a forward subset of the set of wheels, or of a rear subset of the set of wheels, and wherein activation of the pitch-back mechanism increases the rotational speed of all the wheels of the set of wheels, of the forward subset, or of the rear subset.

7. The apparatus of claim 1, wherein activation of the roll-right mechanism slows the rotational speed of a right subset of the set of wheels, increases the rotational speed of a left subset of the set of wheels, or both, and wherein activation of the roll-left mechanism increases the rotational speed of a right subset, slows the rotational speed of a left subset, or both.

8. An apparatus that changes one or more of in-air pitch and roll angles of a ground vehicle, comprising:
    a steering input mechanism that receives steering inputs and one or more of pitch and roll control inputs from a driver of the vehicle;
    a support structure that connects the steering input mechanism to at least one of: the vehicle, and one or more wheels of a set of wheels on which the vehicle travels over ground;
    an articulator that rotatably connects the steering input mechanism to the support structure and enables rotation of the steering input mechanism about one or more axes parallel to the steering input mechanism;
    and one or more of a pitch-forward, a pitch-back, a roll-right, and a roll-left input mechanism disposed adjacent to the steering input mechanism, wherein rotation of the steering input mechanism about at least one of the axes activates one or more of said mechanisms, causing transmission of one or more electrical signals that adjust the rotational speed of one or more wheels of the set of wheels.

9. The apparatus of claim 8, wherein the articulator comprises a compressible panel, and wherein one or more of said mechanisms comprises a button disposed within the articulator, wherein the button is electrically connected to an electronic control unit, the electronic control unit storing instructions to adjust the rotational speed.

10. The apparatus of claim 9, further comprising a retractable solenoid, wherein the support structure comprises a steering column, and wherein the solenoid extends from the steering column, through the articulator, and into the steering input mechanism, thereby preventing rotation of the steering input mechanism about the at least one of the axes.

11. The apparatus of claim 8, wherein the roll-right input mechanism is disposed to the right of a position where the articulator connects to the support structure and the roll-left input mechanism is disposed to the left of said position.

12. The apparatus of claim 8, wherein the roll-right input mechanism is disposed to the right of a position where the articulator connects to the support structure and the roll-left input mechanism is disposed to the left of said position.

13. The apparatus of claim 8, wherein activation of the pitch-forward mechanism slows the rotational speed of all the wheels of the set of wheels, of a forward subset of the set of wheels, or of a rear subset of the set of wheels, and wherein activation of the pitch-back mechanism increases the rotational speed of all the wheels of the set of wheels, of the forward subset, or of the rear subset.

14. The apparatus of claim 8, wherein activation of the roll-right mechanism slows the rotational speed of a right subset of the set of wheels, increases the rotational speed of a left subset of the set of wheels, or both, and wherein activation of the roll-left mechanism increases the rotational speed of a right subset, slows the rotational speed of a left subset, or both.

15. A ground vehicle, comprising:
one or more wheels on which the vehicle travels over ground;
a steering mechanism that adjusts a tilt of at least one of the wheels relative to the vehicle;
a throttle control that increases a rotational speed of at least one of the wheels;
a brake control that decreases the rotational speed of the at least one of the wheels, one or more others of the wheels, or combinations thereof; and
one or more of a pitch-forward, a pitch-back, a roll-right, and a roll-left mechanism, wherein user activation of any of the pitch-forward, pitch-back, roll-right and roll-left mechanisms adjusts one or more of said rotational speeds according to a desired in-air pitch, roll or pitch and roll of the vehicle.

16. The ground vehicle of claim 15, further comprising an electronic control unit that stores at least one of the desired in-air pitch and roll of the vehicle.

17. The ground vehicle of claim 16, further comprising one or more yaw rate sensors and a visual display, each electronically connected to the electronic control unit, wherein the yaw rate sensors measure a current pitch, roll, or pitch and roll of the vehicle, and wherein the visual display displays to a user of the vehicle a difference between the desired in-air pitch, roll, or pitch and roll of the vehicle and the current pitch, roll, or pitch and roll of the vehicle.

18. The ground vehicle of claim 15, wherein one or more of said mechanisms comprise an electronic control unit, one or more yaw rate sensors, and programming on stored on the electronic control unit that, when executed, compares a current pitch, roll or pitch and roll to the desired pitch, roll or pitch and roll stored on the electronic control unit, and adjusts said rotational speeds automatically until the current pitch, roll or pitch and roll matches the desired pitch, roll or pitch and roll.

19. The ground vehicle of claim 15, wherein one or more of said mechanisms include electronic buttons disposed on the steering input mechanism and electronically connected to an electronic control unit, the electronic control unit storing the desired in-air pitch, roll or pitch and roll of the vehicle.

20. The apparatus of claim 1, wherein the steering input mechanism receives steering inputs and pitch and roll control inputs from a non-driver of the vehicle.

* * * * *